A. T. Bleyley.
Vegetable Cutter.

N° 53,262.   Patented Mar. 20, 1866.

Witnesses.   Inventor:

UNITED STATES PATENT OFFICE.

A. T. BLEYLEY, OF OTTUMWA, IOWA.

IMPROVED VEGETABLE-CUTTER.

Specification forming part of Letters Patent No. 53,262, dated March 20, 1866.

*To all whom it may concern:*

Be it known that I, A. T. BLEYLEY, of Ottumwa, in the county of Wapello and State of Iowa, have invented a new and useful Improvement in Vegetable-Cutters; and I do hereby declare that the following is a full, clear, and exact description thereof, which will enable others skilled in the art to make and use the same, reference being had to the accompanying drawings, forming part of this specification, in which—

Figure 1:
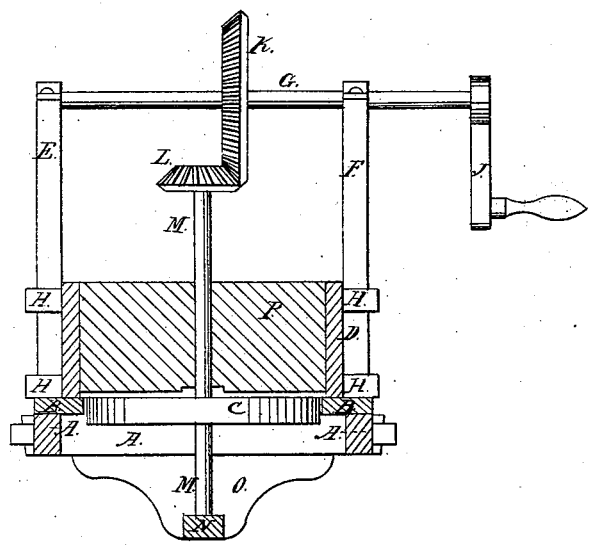
Figure 2:
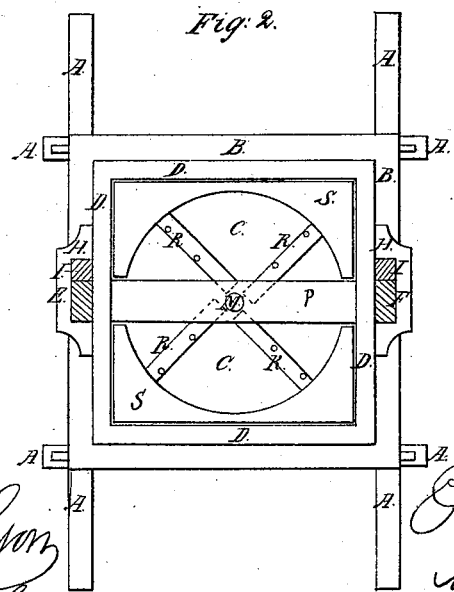

Figure 1 is a vertical longitudinal central section of my improved vegetable-cutter. Fig. 2 is a top or plan view of the same, the gearing and upper parts of the side posts being removed.

Similar letters of reference indicate like parts.

My invention has for its object the furnishing a neat, cheap, and serviceable vegetable-cutter; and it consists of a vegetable-cutter formed by combining and arranging the parts of the machine as hereinafter more fully described.

A is the frame that supports and sustains the other parts of the machine. Upon the frame A is laid a platform, B, having a circular hole through it for the reception of the knife or cutter wheel C. Upon the platform B is erected a square box, D, surrounding the circular hole through the said platform.

E and F are side posts that support the shaft G. The lower ends of these posts rest upon the platform B, and they are kept in position against the sides of the box D by the straps H. The said posts E and F may be secured at any desired elevation by the wedges I.

In bearings at the top of the posts E and F revolves the shaft G, to which motion is given by the crank J. To the shaft G is attached a bevel-gear wheel, K, which meshes into the bevel-gear wheel L, attached to the upper end of the vertical shaft M. This shaft is pivoted to the cross-piece N, which is sustained by supports O projecting downward from the frame A.

The shaft M is held in place so the gear-wheel L shall mesh into the gear-wheel K, by passing through bearings in the partition P.

The shaft M passes up through the center of the machine, and carries the cutter or knife wheel C, which fits into the circular hole through the platform B and revolves with the revolution of the shaft M, to which it is attached.

Upon the upper surface of the wheel C are placed four knives, R, slightly inclined, so that their edges may project a little above the surface of the wheel to take hold of and slice or cut the vegetables that may be in contact with the upper surface of the wheel. Through the wheel, immediately beneath the knives R, are cut holes or openings, through which the cut or sliced vegetables may fall into a receptacle beneath.

The partition P extends across the box D, dividing said box into two equal portions, and extends downward far enough to prevent the vegetables from passing under said partition uncut. It also furnishes a support against which the vegetables are held while being acted upon by the knives R.

S is a casing placed in the box D, filling up the corners of said box, and making the chambers into which the box D is divided by the partition P semi-cylindrical in form, as shown in Fig. 2. The casing S extends so far inward as to cover the outer edge of the wheel C, preventing the vegetables from getting into the corners or edges of the box, and thus escaping the action of the knives.

I claim as new and desire to secure by Letters Patent—

The combination and arrangement of the cutter C, partition P, casing S, and box D, constructed and operating in the manner and for the purpose herein specified.

The above specification of my invention signed by me this 25th day of November, 1865.

A. T. BLEYLEY.

Witnesses:
AND. BLEYLEY,
F. KOAK.